(12) United States Patent
Porat (10) Patent No.: US 10,498,854 B2
(45) Date of Patent: Dec. 3, 2019

(54) METHOD AND CONTROLLER FOR CLUSTERING APPLICATIONS IN A SOFTWARE-DEFINED NETWORK

(71) Applicant: Huawei Technologies Co., Ltd., Shenzhen (CN)

(72) Inventor: Hayim Porat, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 379 days.

(21) Appl. No.: 15/147,663

(22) Filed: May 5, 2016

(65) Prior Publication Data
US 2016/0277525 A1 Sep. 22, 2016

Related U.S. Application Data

(63) Continuation of application No. PCT/EP2013/074887, filed on Nov. 27, 2013.

(51) Int. Cl.
*G06F 15/173* (2006.01)
*H04L 29/08* (2006.01)
*G06F 8/36* (2018.01)

(52) U.S. Cl.
CPC ............ *H04L 67/2895* (2013.01); *G06F 8/36* (2013.01); *H04L 67/1095* (2013.01); *H04L 67/34* (2013.01)

(58) Field of Classification Search
CPC . H04L 67/2895; H04L 67/34; H04L 67/1095; G06F 8/36

(Continued)

(56) References Cited

U.S. PATENT DOCUMENTS

2003/0187927 A1* 10/2003 Winchell ............ G06F 11/1492
709/204
2003/0187991 A1* 10/2003 Lin .................... G06F 9/505
709/227

(Continued)

FOREIGN PATENT DOCUMENTS

CN 103095565 A 5/2013
CN 103338163 A 10/2013
WO 2013093858 A1 6/2013

OTHER PUBLICATIONS

Jiang et al., "An Architecture of Service Chaining," Internet Working Group, Internet Draft, pp. 1-10, draft-jiang-service-chaining-arch-00.txt, IETF Trust, Reston, Virginia (Jun. 27, 2013).

(Continued)

*Primary Examiner* — Farzana B Huq
(74) *Attorney, Agent, or Firm* — Leydig, Voit & Mayer, Ltd.

(57) ABSTRACT

The present disclosure relates to a method for clustering applications in a software defined network, SDN. The method comprises creating a clustering infrastructure in an SDN controller. The clustering infrastructure is a module for sharing and synchronizing information between different controller instances of the SDN controller. The method further comprises creating at least one clustering application programming interface, clustering API, between at least one application and the SDN controller. By using the at least one application API different application instances of the at least one application can be registered with the different controller instances. Finally, all application instances can be synchronized using the clustering infrastructure. The disclosure further relates to a SDN controller for clustering applications in the SDN, and a SDN application for clustering in the SDN.

18 Claims, 3 Drawing Sheets

(58) Field of Classification Search
USPC ......... 709/202–204, 223–224, 227–229, 238
See application file for complete search history.

(56) References Cited

U.S. PATENT DOCUMENTS

| | | |
|---|---|---|
| 2005/0050106 A1 | 3/2005 | Wenner et al. |
| 2013/0047165 A1* | 2/2013 | Goetz .................. G06F 9/5027 718/105 |
| 2013/0283374 A1 | 10/2013 | Zisapel et al. |
| 2014/0089500 A1* | 3/2014 | Sankar .................. H04L 47/125 709/224 |
| 2014/0369204 A1* | 12/2014 | Anand .................. H04L 47/125 370/235.1 |
| 2015/0271270 A1* | 9/2015 | Edlund .................. H04L 67/148 709/227 |

OTHER PUBLICATIONS

Fernando et al., "Virtual Topologies for Service Chaining in BGP IP VPNs," Internet-Draft, pp. 1-15, draft-rfernando-13vpn-service-chaining-02, IETF Trust, Reston, Virginia (Jul. 15, 2013).
Takacs et al., "Software-defined networking: the service provider perspective," Ericsson Review, Ericsson Telefon AB L.M., Stockholm, Sweden (Feb. 21, 2013).

* cited by examiner

METHOD AND CONTROLLER FOR CLUSTERING APPLICATIONS IN A SOFTWARE-DEFINED NETWORK

CROSS-REFERENCE TO RELATED APPLICATIONS

This application is a continuation of International Patent Application No. PCT/EP2013/074887, filed on Nov. 27, 2013, which is hereby incorporated by reference in its entirety.

TECHNICAL FIELD

The present disclosure relates to a method and a controller for clustering applications in a software-defined network (SDN). The controller is in particular a SDN controller. The present disclosure further relates to a SDN application for clustering. In particular, the present disclosure provides a method for connecting and coordinating the clustering mechanisms of the SDN controller and at least one application.

BACKGROUND

In the state of the art, SDN is an emerging network technology, which is able to simplify communication networks by decoupling a data plane from a control plane. Thereby, the control plane functions are typically provided by a SDN controller. SDN applications can be registered with the SDN controller, and may run on the SDN controller. The SDN controller may further provide service chains of multiple SDN applications, which then operate sequentially on network traffic, i.e. on at least one data flow. In a basic SDN implementation there is only a single SDN controller having one or more SDN applications registered to it and running on it. The SDN controller connects to the one or more SDN applications using a north bound interface (NBI).

However, the basic SDN implementation causes problems when it needs to be scaled. For instance, the SDN controller may need to be distributed into a cluster of a plurality of controller instances. Or a computationally intense SDN application needs to be distributed into a cluster of a plurality of application instances. Currently, the state of the art provides distribution mechanisms of SDN controller and SDN applications, which are disconnected from each other, and are not in any way coordinated.

Figure 1A:
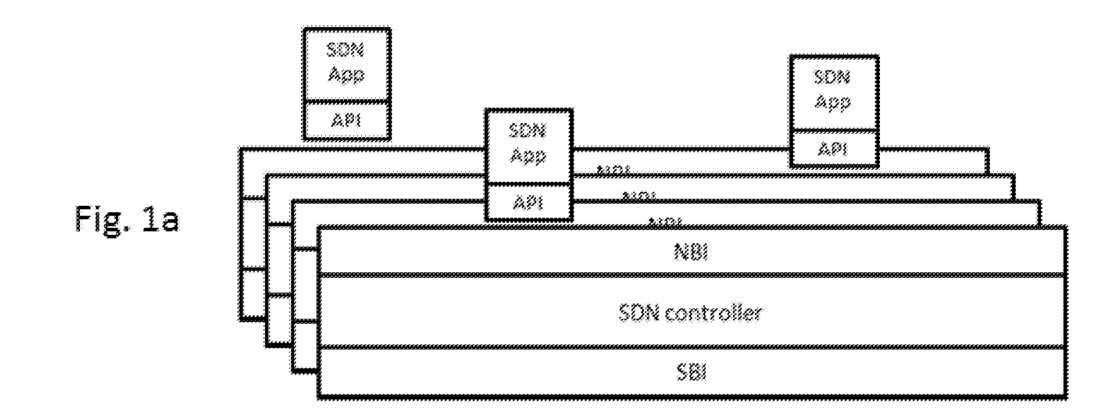
FIG. 1a shows a SDN controller of the state of the art distributed into multiple controller instances, wherein on each controller instance a SDN application is run.

FIG. 1a shows a first typical solution used in the state of the art, in which the SDN controller is clustered into a plurality of controller instances. However, the SDN applications are not clustered with it. Therefore, at most each of a plurality of SDN applications may run on a different controller instance. This solution makes particularly a service chaining of a plurality of applications very complex.

Figure 1B:
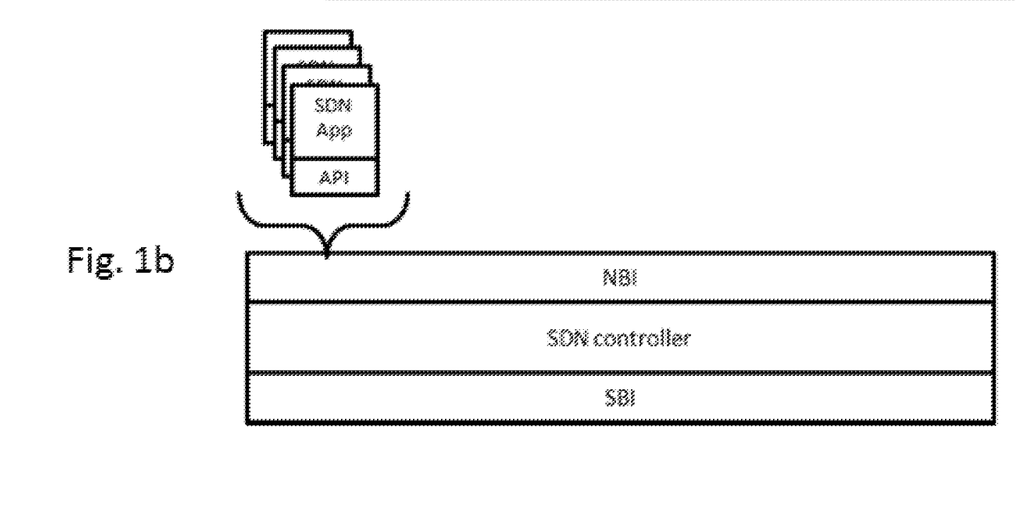
FIG. 1b shows an application in the state of the art over a single SDN controller instance, on which a SDN application distributed into multiple application instances is run.

FIG. 1b shows a second typical solution used in the state of the art, in which an SDN application is clustered into a plurality of application instances. However, the SDN application must still use a proprietary method, and must still connect to a single controller instance of the SDN controller.

A problem with the above-described solutions used in the state of the art is, that no infrastructure is provided by the controller for application high availability. High availability is a system design approach and associated service implementation, which intends to ensure a certain level of operational performance. In particular, the term availability refers to the ability of a user to obtain a service via the network or to access the network. If the network is inaccessible or a service may not be obtained, the application is not available to the user. For high availability, the network and specifically the applications of the network need to be available at all times.

SUMMARY

In view of the above disadvantages and problems, the present disclosure aims to improve the state of the art. In particular, an object of the present disclosure is to provide distribution and high availability infrastructure for applications running on a SDN controller in a SDN. In particular, the present disclosure aims to increase the availability of applications in a SDN, and also the operational performance of these applications. The present disclosure also has the goal to increase the performance of the SDN controller. At the same time, the present disclosure intends to keep the complexity of the SDN at a minimum.

The above-mentioned object of the present disclosure is achieved by the solution provided in the enclosed independent claims. The core idea of the disclosure is to provide a solution to connect and coordinate the distribution (clustering) mechanisms of the SDN controller into different controller instances and at least one SDN application into different application instances. Advantageous implementations of the present disclosure are further defined in the respective dependent claims. According to the claimed method, the claimed SDN controller, and the claimed SDN application, the performance and availability of the SDN as a whole and services provided over the SDN can be drastically improved.

A first aspect of the present disclosure provides a method for clustering applications in a software defined network, SDN, the method comprising creating a clustering infrastructure in an SDN controller, wherein the clustering infrastructure is a module for sharing and synchronizing information between different controller instances of the SDN controller, creating at least one clustering application programming interface, clustering API, between at least one application and the SDN controller, registering different application instances of the at least one application with different controller instances using the at least one application API, and synchronizing all application instances using the clustering infrastructure.

By the method of the present disclosure the distribution mechanisms of the SDN controller and of the at least one application are connected and coordinated. The at least one application is particularly enabled to cluster and to distribute using the clustering infrastructure of the SDN controller. In other words, both the application and the SDN controller can cluster at the same time, and the clustered applications instances must not all connect to the same controller instance, but may distribute over the different controller instances for their registration to the SDN controller. As a consequence, the complexity of service chaining is significantly reduced.

Both the SDN controller and the at least one application may scale in and/or scale out independently from another, for instance, in any defined M:N ratio, where M and N are natural numbers of 1 or greater. The scaling in or out, respectively, may comprise automatic load balancing of the different applications instances running on the different controller instances. By means of the method of the present disclosure, an infrastructure for application high availability is provided.

It is further possible with the method of the present disclosure that a plurality of applications each registers its different application instances with different controller instances. In this case, each application may distribute in a different manner across the different controller instances. The SDN controller may automatically balance the load for each application over its different controller instances and/or may automatically balance the load of the entirety of the plurality of applications across its different controller instances.

In a first implementation form of the method according to the first aspect, the method further comprises creating a state table in the SDN controller, wherein the state table is shared across all controller instances using the clustering infrastructure, storing, by the at least one application, its application states in the state table, and synchronizing all application instances using the application states stored in the state table.

Application states may be of different structures and model, and may include but are not limited to information such as: state machine information, flow table information, buffers content etc. The application instances may share all of the application states in the shared state table, and thus are fully stateless by themselves, or may share only a part of the states via the shared state table, and thus are partially stateless.

The states of the at least one application are thus moved from the at least one application to the SDN controller in the present disclosure, thereby enabling the SDN controller to distribute a plurality of application instances over its controller instances in an easy and efficient manner, and to optimize the distribution of the plurality of application instances over its controller instances, for example, regarding load balancing. The state table also enables the SDN controller to perform an efficient synchronization of the individual application instances, thus guaranteeing an optimal performance of the respective application. The state table may also allow different applications to share information with each other, for instance, regarding their states, in order to avoid interferences between different applications, and/or to support the use of synergies. The information sharing between different applications is particularly advantageous, when a plurality of applications is chained together by the SDN controller in a service chain. In the service chain the applications may operate sequentially or in parallel on a data flow.

In a second implementation form of the method according to the first implementation form of the first aspect, the state table is a high-speed data store and/or an unstructured data store.

In particular, the data store is preferably a Not only Structured Query Language (NoSQL) data store, e.g. a Key Value store.

In a third implementation form of the method according to the first implementation form of the first aspect, the state table is a data store structured by the at least one application.

In a fourth implementation form of the method according to the first aspect as such or according to any of the previous implementation forms of the first aspect, the state table is exposed to the at least one application through the at least one clustering API.

The at least one clustering API provides a standardized interface for various kinds of applications. Application developing is therefore drastically simplified. The at least one clustering API further enables the at least one application and the SDN controller to discover distributed instances of each other, respectively, access and expose the state table, register different application instances with different controller instances in an easy manner, and the use by the at least one application of the controller infrastructure, particularly its connectivity to, for example, a cloud management system. Via the at least one clustering API the at least one application can furthermore negotiate a multi-instance high availability with the SDN controller.

In a fifth implementation form of the method according to the first aspect as such or according to any of the previous implementation forms of the first aspect, the step of creating the at least one clustering API comprises providing a clustering API to each application instance and to each controller instance.

Thus, each different application instance of the at least one application can negotiate individually with a different controller instance about its registration, whereby particularly load balancing by the SDN controller is simplified.

In a sixth implementation form of the method according to the first aspect as such or according to any of the previous implementation forms of the first aspect, the method further comprises discovering, by the at least one application and by the SDN controller, different controller instances and application instances of each other, respectively, using the at least one clustering API.

In a seventh implementation form of the method according to the sixth implementation form of the first aspect, the method further comprises automatically registering a newly discovered application instance of the at least one application with a controller instance wherein a load of all application instances is automatically balanced between the different controller instances.

The above sixth and seventh implementation forms of the method of the present disclosure enable auto discovery and auto registration between different application instances of at least one application and different controller instances of the SDN controller, respectively. In particular, when additionally service chaining is implemented by the SD controller, i.e. when a plurality of applications is chained, the SDN performance can be increased.

In an eighth implementation form of the method according to the fifth implementation form of the first aspect, the load of the application instances is delivered to the SDN controller using the at least one API.

Based on the delivered load, the SDN controller can quickly and precisely balance the load of the different application instances over its different controller instances, for example by redistributing the user or network calls for each application instance, or by redistributing the application shared states between the application instances.

In a ninth implementation form of the method according to the first aspect as such or according to any of the previous implementation forms of the first aspect, for scaling out the at least one application, the method comprises requesting, by the at least one application using the at least one clustering API, the SDN controller to create at least one new application instance, initiating, by the SDN controller, a new application instance, and registering, by the SDN controller, the new application instance to existing application instances of the at least one application.

Thus, for scaling out as required, for example by computational demands, the at least one application needs only to request the SDN controller accordingly to initiate and register another instance of the at least one application, the SDN controller then takes care of the application instance integration. As a consequence, application developers must not make any integration considerations for scaling out, respectively. Scaling in of applications may be implemented in the same manner.

In a tenth implementation form of the method according to the ninth implementation form of the first aspect, the method further comprises communicating, by the clustering infrastructure, with a managing system of the SDN controller or of a cloud system for dynamically adding the at least one new application instance.

The at least one application may access the clustering infrastructure of the SDN controller via the at least one clustering API, in order to perform and/or request its auto scaling using the interface of the SDN controller to the managing system of the SDN controller or of a cloud system.

In an eleventh implementation form of the method according to the ninth or tenth implementation forms of the first aspect, the method further comprises exposing, by the SDN controller, the state table to the new application instance, and synchronizing all existing application instance with the new application instance of the at least one application using the clustering infrastructure and the application states stored in the state table.

The new application instance may thus be made aware of all application states of the existing application instances, and it can accordingly adapt these application states, in order to be more easily and efficiently integrated into the system, i.e. the group of existing application instances, and synchronized with the existing application instances.

In a twelfth implementation form of the method according to the tenth or eleventh implementation forms of the first aspect, the at least one application uses the clustering infrastructure of the SDN controller communicating with the management system to automatically scale in or out as needed.

The at least one application preferably scales out automatically, e.g., if its computation demands become too intense, and scales in automatically, e.g., in order to reduce the complexity of the system, if less computation resources are needed. The at least one application can automatically scale in or out independently from the scaling in or out of the SDN controller.

In a thirteenth implementation form of the method according to the first aspect as such or according to any of the previous implementation forms of the first aspect, for scaling in or out the SDN controller, the method comprises creating or deleting a new controller instance of the SDN controller, and registering the new controller instance with at least one the application instance of the at least one application using the clustering API, wherein a load of the application instances is automatically balanced between the different controller instances.

Due to the automatic load balancing, the performance of the at least one application running on the SDN controller is increased, while at the same time the system complexity, i.e., the number of controller instances, can kept at a minimum.

A second aspect of the present disclosure provides a software defined network, SDN, controller for clustering applications in a SDN comprising a clustering infrastructure, which is a module for sharing and synchronizing information between different controller instances of the SDN controller, at least one clustering application programming interface, clustering API, for connecting to at least one application, wherein the SDN controller is configured to register different application instances of the at least one application with different controller instances using the at least one application API, and to synchronize all application instances using the clustering infrastructure.

The SDN controller of the present disclosure provides the same advantages as the above-described method of the present disclosure. In particular, the SDN controller may provide application high availability to the SDN by allowing one or more applications to cluster into different application instances, together with its own clustering into different controller instances. The SDN controller can distribute different applications instances over a plurality of its controller instances.

In a first implementation form of the SDN controller according to the second aspect, the SDN controller further comprises a state table for storing application states of the at least one application, wherein the state table is shared across all controller instances through the clustering infrastructure, wherein the SDN controller is configured to synchronize all application instances using the application states stored in the state table.

In a second implementation form of the SDN controller according to the second aspect as such or according to the first implementation form of the second aspect, the state table is a high-speed data store and/or an unstructured data store.

In a third aspect the present disclosure provides a software defined network, SDN, application for clustering in a SDN, comprising at least one clustering application programming interface, clustering API, for connecting to a SDN controller, wherein the SDN application is configured to negotiate with the SDN controller using the at least one application AP, in order to register different application instances with different controller instances of the SDN controller.

The SDN application according to the present disclosure works together with the SDN controller of the present disclosure, in order to achieve the above-described advantages of the method of the present disclosure.

BRIEF DESCRIPTION OF DRAWINGS

The above aspects and implementation forms of the present disclosure will be explained in the following description of specific embodiments in relation to the enclosed drawings, in which.

DETAILED DESCRIPTION OF EMBODIMENTS

Figure 2:
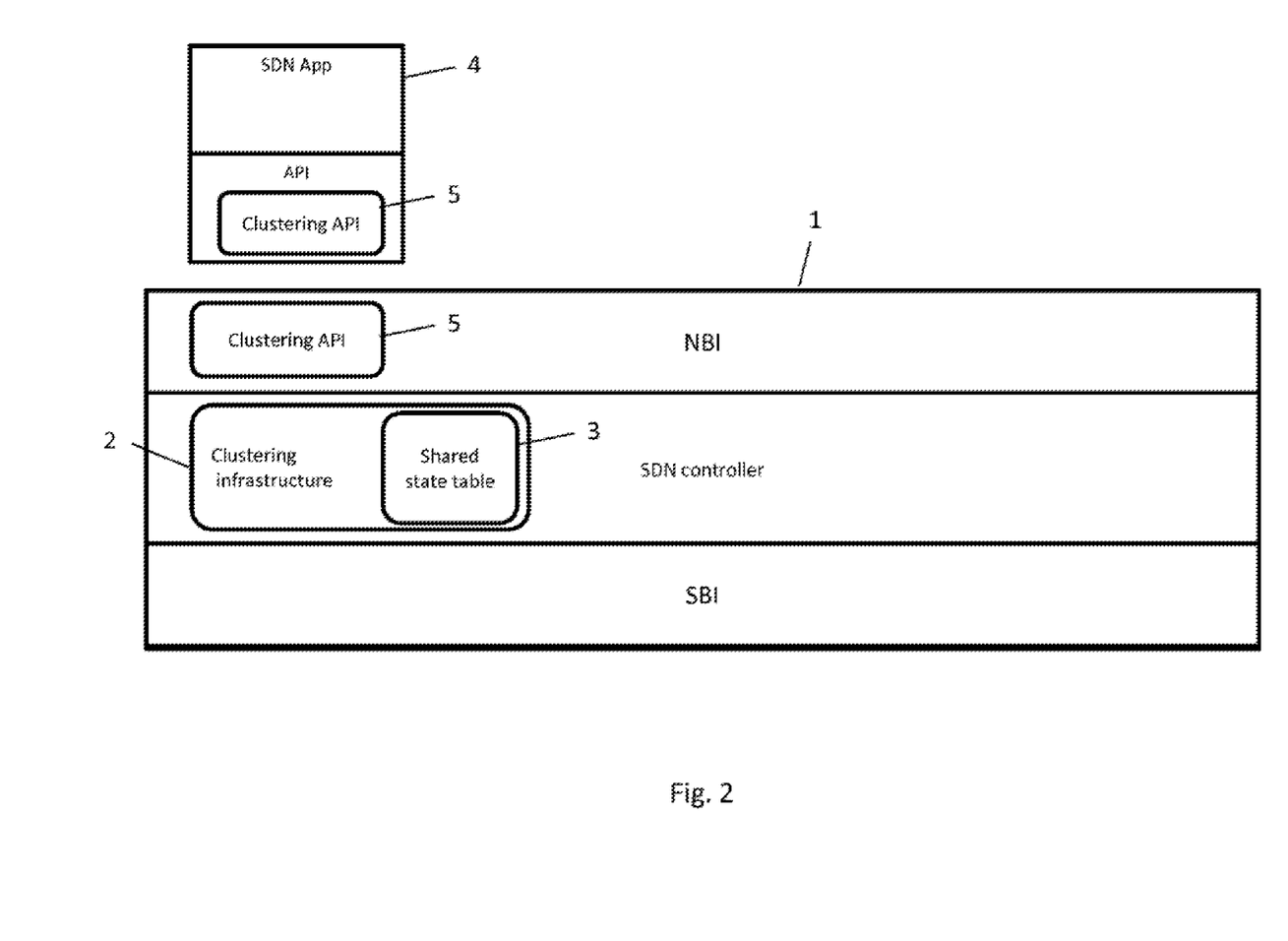
FIG. 2 shows a SDN environment, in which an SDN application according to an embodiment of the present disclosure is run on a SDN controller according to another embodiment of the present disclosure.

FIG. 2 shows a SDN controller 1 and a SDN application 4 of embodiments of the present disclosure in a SDN environment. The SDN application 4 is registered to the SDN controller 1 using a north bound interface (NBI), and runs on the SDN controller 1. More than one application 4 may be registered and run in the same manner on the SDN controller 1. As will be explained in more detail below in respect to FIG. 3, a plurality of different application instances of the at least one application 4 can be registered with different controller instances of the SDN controller 1.

Thereby, the distribution mechanisms of the SDN controller 1 and the at least one application 4 can be connected and coordinated.

The SDN controller 1 shown in FIG. 1 comprises the NBI, and also comprises a south bound interface (SBI). Furthermore, a clustering infrastructure 2 is created in the SDN controller 1. The clustering infrastructure 2 is a module, which is responsible for sharing and synching information within the SDN controller 1, specifically between different controller instances of the SDN controller 1. Optionally, the clustering infrastructure 2 can also communicate with a manager of the SDN controller 1, or with a manager of a cloud system, into which the SDN controller 1 is integrated.

In the SDN controller 1, further a state table 3 is created. The state table 3 can be a part of the clustering infrastructure 2 or can be separate and connected to the clustering infrastructure 2. The state table 3 is distributed by the clustering infrastructure 2 over all controller instances of the SDN controller 1, and can thus be regarded as a shared state table 3. The state table 3 is preferably a high-speed data store, which is available for the at least one application 4, particularly for storing its application states. Preferably, the state table 3 is an unstructured data store, i.e., is a NoSQL data store, which enables flexible and extendable application state schemes. The state table 3 can, for example, be a memory chip, which is preferably implemented with a database. By employing the state table 3 in the SDN controller 1, the application states of the at least one application 4 can be moved from the at least one application 4 to the SDN controller 1. Thereby, the information about application states is centralized in the SDN controller 1, which allows a better performance of the SDN controller 1, in particular if the SDN controller 1 runs a plurality of applications 4. Specifically, load balancing of different applications 4 and/or different application instances over different controller instances, or a service chaining of multiple applications 4 is significantly improved.

In the SDN controller 1 further a clustering API 5 is created. Furthermore, a clustering API 5 is also created in the at least one SDN application 4. At least one clustering API 5 is thus provided both at the controller side and the application side. At least one clustering API 5 is thus created between the at least one application 4 and the SDN controller 1. The at least one clustering API 5 enables the SDN controller 1 to discover distributed application instances of the at least one SDN application 4. Likewise the clustering API 5 enables the at least one SDN application 4 to discover distributed controller instances of the SDN controller 1. Furthermore, the state table 3 can be exposed through the clustering API 5 to the at least one SDN application 4, particularly to each application instance of the at least one SDN application 4. The clustering API 5 of the application side and the controller side, respectively, is further used to register the at least one application 4 to the SDN controller 1, in particular to register different application instances of the at least one application 4 to different controller instances of the SDN controller 1. Finally, the clustering API 5 between the at least one SDN application 4 and the SDN controller 1 is also useful for allowing the at least one SDN application 4 to use the SDN controller 1 infrastructure and its connectivity to a cloud management system, for example, to scale out or in automatically.

Figure 3:
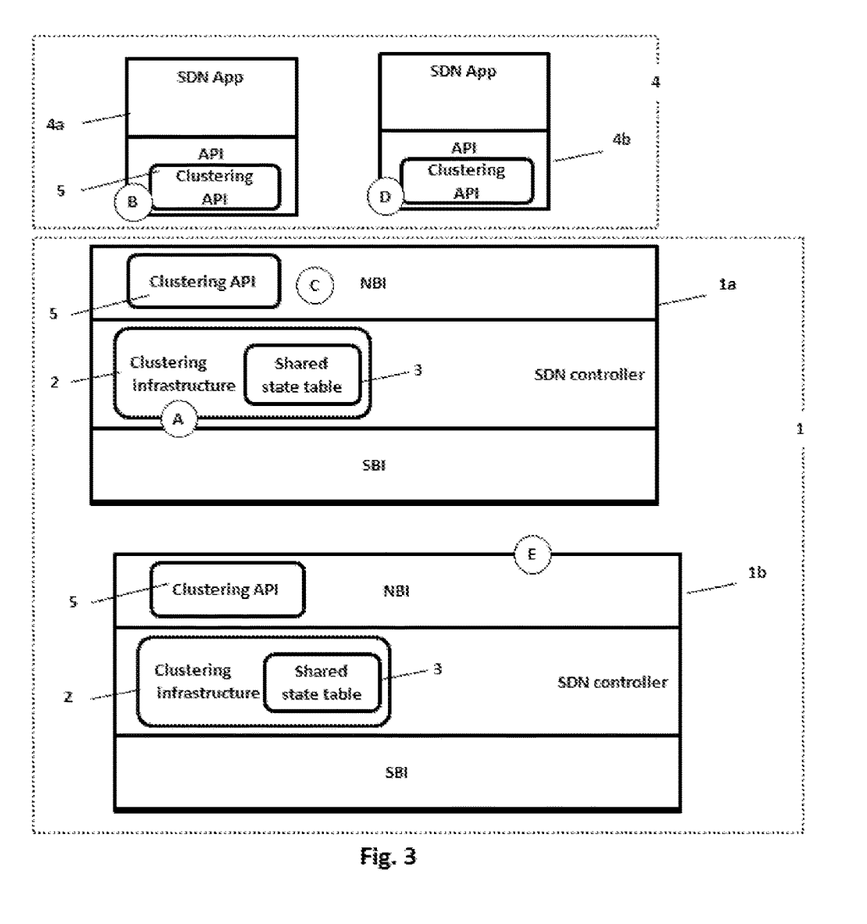
FIG. 3 shows a SDN environment, in which a SDN application according to an embodiment of the present disclosure is clustered into multiple application instances, which are run on multiple controller instances of a SDN controller of another embodiment of the present disclosure.

FIG. 3 illustrates the principle of operation of the method according to an embodiment of the present disclosure, carried out by an SDN application 4 and an SDN controller 1. More than one SDN application 4 may follow the same principle of operation. FIG. 3 shows particularly a SDN application 4, which is initially distributed into at least one application instance 4a, which is shown in FIG. 3 as one application instance 4a but can be multiple application instances 4a. The at least one application instance 4a includes at least one clustering API 5. FIG. 3 further shows the SDN controller 1, which is distributed into a cluster of at least one controller instances 1a, which is shown in FIG. 3 as one controller instance 1a but can be multiple controller instances 1a. The at least one controller instance 1a includes a NBI, a SBI, at least one clustering API 5, at least one clustering infrastructure 2 and at least one state table 3. The state table 3 may be shared via the clustering infrastructure 2 over a plurality of controller instances 1a.

The labels A-E indicate different operational steps carried out for implementing the method of an embodiment of the present disclosure.

Initially, in step A, the SDN controller 1 implements a state table 3 and a clustering infrastructure 2, wherein the state table 3 is distributed across the at least one controller instance 1a using the clustering infrastructure 2.

In step B, at least one clustering API 5 is implemented in the SDN application 4, in particular in the at least one application instance 4a of the SDN application 4. For the case of a plurality of application instances 4a, at least one clustering API 5 is implemented in each application instance 4a.

In step C, the clustering API 5 in the SDN application 4 negotiates the registration of the at least one application instance 4a with the at least one controller instance 1a of the SDN controller 1 via the at least one clustering API 5 of the SDN controller 1. In other words, the application 4 uses the at least one clustering API 5 to negotiate a multi-instance high availability with the SDN controller 1. Thereby, different application instances 4a may be registered with different controller instances 1a using the at least one application API 5. The SDN controller 1 uses the clustering infrastructure 2, and preferably the state table 3, in order to synchronize all application instances 4a over the different controller instances 1a. The application 4 may store its application states in the state table 3, and the SDN controller 1 can synchronizes all application instances 4a using the application states stored in the state table.

In step D, when there is a need for the SDN application 4 to scale out, it requests the addition of a new node from the SDN controller 1 using at least one clustering API 5. The SDN controller 1 then preferably connects to its management, and spawns a new application instance 4b, and registers the new application instance 4b to the at least one existing application instance 4a, which is already registered with the SDN controller 1. The state table 3, and thus all application states of the existing application instances 4a, are preferably exposed to the new application instance 4b, which can consequently be quickly synchronized. The new application instance 4b can in particular be configured according to the exposed application states of the existing application instances 4a, in order to synchronize it efficiently with these application instances 4a. Scaling in of the at least one application 4, i.e., reducing the number of application instances 4a and 4b is done in a similar manner.

In step E the SDN controller 1 needs to scale out (or in). To this end, a new controller instance 1b may be created (or a controller instance 1b may be deleted). The new controller instance 1b then renegotiates with preferably all application instances 4a and 4b, and uses its clustering API 5, in order to balance the load of all application instances 4a and 4b between itself and the existing controller instances 1a.

The present disclosure as described by the FIGS. 2 and 3 enables the SDN controller 1 and the at least one application 4 running on the SDN controller 1 to scale in or out independently from another, in order to establish any desired M:N ratio describing a ratio of application instances 4$a$ and 4$b$:controller instances 1$a$ and 1$b$. The SDN controller 1 is preferably configured to automatically balance the load of different application instances 4$a$ and 4$b$, which are run on its different controller instances 1$a$ and 1$b$. In particular, the SDN controller 1 is preferably configured to exchange via the clustering infrastructure 2 information concerning the at least one application 4, all different application instances 4$a$ and 4$b$, and all application states that are stored in the state table 3.

In summary, the present disclosure succeeds to provide a clustering and high availability infrastructure to the SDN controller 1. This infrastructure enables the at least one application 4 to cluster and distribute into a plurality of application instances 4$a$ and 4$b$ using the clustering infrastructure 2 of the SDN controller 1. The application 4 may thereby use the clustering mechanism of the SDN controller 1 to automatically scale out and in as needed. The present disclosure particularly enables auto-discovery and auto-registration between different application instances 4$a$ and 4$b$ of the at least one application 4 and different controller instances 1$a$ and 1$b$ of the SDN controller 1, respectively. As a result, an infrastructure for high availability of applications 4 is provided by the method of the present disclosure, and respectively by the SDN controller 1 and at least one SDN applications 4 of the present disclosure working together.

The present disclosure has been described in conjunction with various embodiments as examples as well as implementations. However, other variations can be understood and effected by those persons skilled in the art and practicing the claimed disclosure, from the studies of the drawings, this disclosure and independent claims. In the claims as well as in the description the word "comprising" does not exclude other elements or steps and the indefinite article "a" or "an" does not exclude a plurality. A single element or other unit may fulfill the functions of several entities or items recited in the claims. The mere fact that certain measures are recited in the mutual different dependent claims does not indicate that a combination of these measures cannot be used in an advantageous implementation. A computer program may be stored/distributed on a suitable medium, such as an optical storage medium or a solid-state medium supplied together with or as part of other hardware, but may also be distributed in other forms, such as via the Internet or other wired or wireless telecommunication systems.

What is claimed is:

1. A method for clustering applications in a software defined network (SDN) that includes a clustering infrastructure in an SDN controller for facilitating sharing and synchronizing information between different controller instances of the SDN controller, the method comprising:
   registering, by the SDN controller, different application instances of at least one application with different controller instances using at least one clustering application programming interface (API) between the at least one application and the SDN controller to accommodate loading of the at least one application;
   synchronizing, by the SDN controller, all application instances using the clustering infrastructure;
   balancing, by the SDN controller, loads among the different application and controller instances; and
   scaling, by the SDN controller, a number (M) of the different application instances and a number (N) of the different controller instances so as to maintain a desired M:N ratio in response to changes to loads at the different application and controller instances that are not adequately addressed by rebalancing the loads, including
   creating or deleting a new controller instance of the SDN controller, and
   registering the new controller instance with at least one the application instances of the at least one application using the clustering API, wherein a load of the application instances is automatically balanced between the different controller instances.

2. The method according to claim 1, further comprising:
   creating a state table in the SDN controller, wherein the state table is shared across all controller instances using the clustering infrastructure;
   storing, by the at least one application, its application states in the state table; and
   synchronizing all application instances using the application states stored in the state table.

3. The method according to claim 1, wherein the step of creating the at least one clustering API comprises providing a clustering API to each application instance and to each controller instance.

4. The method according to claim 1, further comprising:
   discovering, by the at least one application and by the SDN controller, different controller instances and application instances of each other, respectively, using the at least one clustering API.

5. The method according to claim 4, further comprising:
   registering a newly discovered application instance of the at least one application with a controller instance, wherein a load of all application instances is automatically balanced between the different controller instances.

6. The method according to claim 5, wherein the load of the application instances is delivered to the SDN controller using the at least one API.

7. The method according to claim 1, wherein for scaling out the at least one application, the method comprises:
   requesting, by the at least one application using the at least one clustering API, the SDN controller to create at least one new application instance;
   initiating, by the SDN controller, a new application instance; and
   registering, by the SDN controller, the new application instance to existing application instances of the at least one application.

8. The method according to claim 7, further comprising:
   communicating, by the clustering infrastructure, with a managing system of the SDN controller or of a cloud system for dynamically adding the at least one new application instance.

9. The method according to claim 2 further comprising:
   exposing, by the SDN controller, the state table to the new application instance; and
   synchronizing all existing application instance with the new application instance of the at least one application using the clustering infrastructure and the application states stored in the state table.

10. A software defined network (SDN) controller for clustering applications in an SDN, the SDN controller comprising:
    a clustering infrastructure configured to share and synchronize information between different controller instances of the SDN controller, and synchronize all application instances;

at least one clustering application programming interface (API) for connecting to at least one application; and the SDN controller is configured to
register different application instances of at least one application with different controller instances using at least one clustering application programming interface (API) between the at least one application and the SDN controller to accommodate loading of the at least one application, wherein the SDN controller and the at least one application scale in or scale out in a defined M:N ratio, where M and N are natural numbers of 1 or greater;
synchronize all application instances using the clustering infrastructure;
balance loads among the different application and controller instances; and
scale a number (M) of the different application instances and a number (N) of the different controller instances so as to maintain a desired M:N ratio in response to changes to loads at the different application and controller instances that are not adequately addressed by rebalancing the loads, including
creating or deleting a new controller instance of the SDN controller, and
registering the new controller instance with at least one the application instances of the at least one application using the clustering API, wherein a load of the application instances is automatically balanced between the different controller instances.

11. The SDN controller according to claim 10, further comprising:
a state table for storing application states of the at least one application, wherein the state table is shared across all controller instances through the clustering infrastructure,
wherein the SDN controller synchronizes all application instances using the application states stored in the state table.

12. The SDN controller according to claim 11, wherein the state table is a high-speed data store, an unstructured data store, or combinations thereof.

13. A non-transitory computer-readable medium carrying a software defined network (SDN) application for clustering in a SDN, the medium comprising instructions for:
configuring at least one clustering application programming interface (API) for connecting to a SDN controller; and
configuring the SDN application to negotiate with the SDN controller using the at least one clustering API in order to
register different application instances with different controller instances of the SDN controller using the at least one clustering API between the at least one application and the SDN controller to accommodate loading of the at least one application;
synchronize all application instances using the clustering infrastructure;
balance loads among the different application and controller instances; and
scale a number (M) of the different application instances and a number (N) of the different controller instances so as to maintain a desired M:N ratio in response to changes to loads at the different application and controller instances that are not adequately addressed by rebalancing the loads, including
creating or deleting a new controller instance of the SDN controller, and
registering the new controller instance with at least one the application instances of the at least one application using the clustering API, wherein a load of the application instances is automatically balanced between the different controller instances.

14. A non-transitory computer-readable medium carrying a computer program with a program code for performing a method when the computer program runs on a computer, the method comprising:
registering different application instances of the at least one application with different controller instances using the at least one clustering application programming interface (API) between at least one application instance and a software defined network (SDN) controller to accommodate loading of the at least one application;
synchronizing all application instances using the clustering infrastructure;
balancing loads among the different application instances and controller instances; and
scaling a number (M) of the different application instances and a number (N) of the different controller instances so as to maintain a desired M:N ratio in response to changes to loads at the different application and controller instances that are not adequately addressed by rebalancing the loads, including
creating or deleting a new controller instance of the SDN controller, and
registering the new controller instance with at least one the application instances of the at least one application using the clustering API, wherein a load of the application instances is automatically balanced between the different controller instances.

15. The non-transitory computer-readable medium according to claim 13, further comprising instructions for configuring a state table for storing application states of the at least one application, wherein the state table is shared across all controller instances through the clustering infrastructure and the SDN controller synchronizes all application instances using the application states stored in the state table.

16. The non-transitory computer-readable medium according to claim 15, wherein the state table is a high-speed data store, an unstructured data store, or combinations thereof.

17. The non-transitory computer-readable medium according to claim 14, the method further comprising configuring a state table for storing application states of the at least one application, wherein the state table is shared across all controller instances through the clustering infrastructure and the SDN controller synchronizes all application instances using the application states stored in the state table.

18. The non-transitory computer-readable medium SDN controller according to claim 17, wherein the state table is a high-speed data store, an unstructured data store, or combinations thereof.

* * * * *

UNITED STATES PATENT AND TRADEMARK OFFICE
CERTIFICATE OF CORRECTION

PATENT NO. : 10,498,854 B2  
APPLICATION NO. : 15/147663  
DATED : December 3, 2019  
INVENTOR(S) : Hayim Porat Page 1 of 1

It is certified that error appears in the above-identified patent and that said Letters Patent is hereby corrected as shown below:

In the Claims

Claim 3, Column 10, Line 21: "the step of" should be deleted.

Signed and Sealed this  
Eleventh Day of May, 2021

Drew Hirshfeld  
*Performing the Functions and Duties of the*  
*Under Secretary of Commerce for Intellectual Property and*  
*Director of the United States Patent and Trademark Office*